(12) United States Patent
Kurashima et al.

(10) Patent No.: US 12,728,541 B2
(45) Date of Patent: Sep. 8, 2026

(54) REMOTE CONTROL SYSTEM, REMOTE CONTROL METHOD, AND REMOTE CONTROL PROGRAM FOR PERFORMING HAPTIC CONTROL

(71) Applicant: KAWASAKI JUKOGYO KABUSHIKI KAISHA, Kobe (JP)

(72) Inventors: Kazuki Kurashima, Kobe (JP); Hitoshi Hasunuma, Kobe (JP); Masayuki Kamon, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 44 days.

(21) Appl. No.: 18/856,921

(22) PCT Filed: Apr. 14, 2023

(86) PCT No.: PCT/JP2023/015228
§ 371 (c)(1),
(2) Date: Oct. 15, 2024

(87) PCT Pub. No.: WO2023/200012
PCT Pub. Date: Oct. 19, 2023

(65) Prior Publication Data

US 2025/0249597 A1 Aug. 7, 2025

(30) Foreign Application Priority Data

Apr. 15, 2022 (JP) ................................ 2022-067839

(51) Int. Cl.
*B25J 13/02* (2006.01)
*B25J 9/16* (2006.01)
*B25J 13/08* (2006.01)

(52) U.S. Cl.
CPC ........... *B25J 13/025* (2013.01); *B25J 9/1689* (2013.01); *B25J 13/082* (2013.01); *G05B 2219/37396* (2013.01)

(58) Field of Classification Search
CPC . B25J 9/1689; B25J 3/04; B25J 13/025; B25J 13/082; B25J 13/085; G05D 1/2242;
(Continued)

(56) References Cited

U.S. PATENT DOCUMENTS 6,411,276 B1 * 6/2002 Braun ..................... G06F 3/011 345/157
9,849,595 B2 * 12/2017 Wang ..................... B25J 13/025
(Continued)

FOREIGN PATENT DOCUMENTS

JP 2019-130602 A 8/2019
JP 2020-131411 A 8/2020
JP 2021-062412 A 4/2021

OTHER PUBLICATIONS

Jun. 20, 2023 International Search Report issued in International Patent Application No. PCT/JP2023/015228.
(Continued)

*Primary Examiner* — Ramon A. Mercado
*Assistant Examiner* — Noah W Stiebritz
(74) *Attorney, Agent, or Firm* — Oliff PLC

(57) ABSTRACT

A remote control system includes an operator to be operated by an operating person, a robot that moves according to operation on the operator, a haptic notifier that notifies occurrence of contact of the robot with an object to the operating person, and a controller that performs force control of moving the robot according to an operation force applied from the operating person to the operator and moving the operator according to a reactive force received by the robot from the outside and notification control of
(Continued)

notifying the occurrence of the contact to the operating person via the haptic notifier if the robot contacts the object.

9 Claims, 5 Drawing Sheets

(58) Field of Classification Search
CPC .......... G05D 1/005; G05B 2219/37396; G05B 2219/39319; G05B 2219/39241; G05B 2219/39322; G05B 2219/39323; G05B 2219/39343; G05B 2219/39338; G05B 2219/39342; G05B 2219/40132; G05B 2219/40619; G05B 2219/36455

See application file for complete search history.

(56) References Cited

U.S. PATENT DOCUMENTS 12,144,576 B2 * 11/2024 Horie ......................... B25J 3/00
12,384,030 B2 * 8/2025 Søe-Knudsen ........ B25J 9/1666
2018/0132956 A1 * 5/2018 Cameron ............... A61B 34/37
2020/0352665 A1 * 11/2020 Itotani .................... B25J 13/085
2020/0405426 A1 12/2020 Horie et al.
2022/0063095 A1 3/2022 Kamon et al.

OTHER PUBLICATIONS

Jun. 20, 2023 Written Opinion issued in International Patent Application No. PCT/JP2023/015228.
Saito et al., "Hardness Rendering Method in Teleoperation System using Force Waveform Generated at Collision", The 36th Annual Conference of the Robotics Society of Japan, Sep. 4, 2018.

* cited by examiner

S1
S2
100
1
2
4
5
6
7
8
10
11
12
13
22
33
40
41
41a
42
43
44
45
50
91
92
P1
P2
W
X
Z

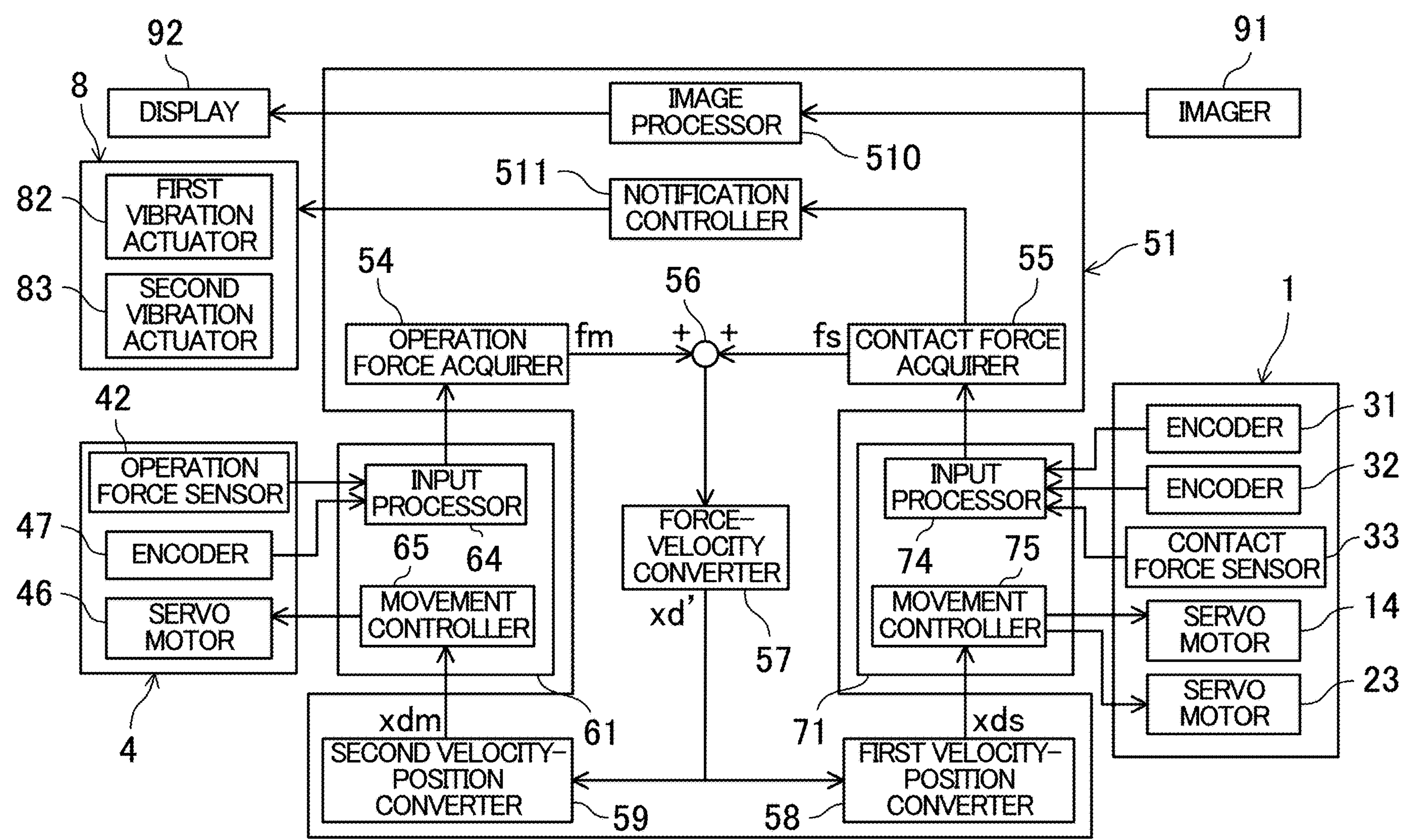
FIG. 5
92
DISPLAY
IMAGE PROCESSOR
510
91
IMAGER
8
FIRST VIBRATION ACTUATOR
82
SECOND VIBRATION ACTUATOR
83
511
NOTIFICATION CONTROLLER
51
54
OPERATION FORCE ACQUIRER
fm
56
+
+
fs
55
CONTACT FORCE ACQUIRER
1
42
OPERATION FORCE SENSOR
INPUT PROCESSOR
64
65
ENCODER
47
SERVO MOTOR
46
MOVEMENT CONTROLLER
4
61
FORCE–VELOCITY CONVERTER
xd'
57
INPUT PROCESSOR
74
75
MOVEMENT CONTROLLER
71
ENCODER
31
ENCODER
32
CONTACT FORCE SENSOR
33
SERVO MOTOR
14
SERVO MOTOR
23
xdm
SECOND VELOCITY–POSITION CONVERTER
59
xds
FIRST VELOCITY–POSITION CONVERTER
58

REMOTE CONTROL SYSTEM, REMOTE CONTROL METHOD, AND REMOTE CONTROL PROGRAM FOR PERFORMING HAPTIC CONTROL

FIELD

The technique disclosed here relates to a remote control system, a remote control method, and a remote control program.

BACKGROUND

Conventionally, there has been known a remote control system that performs force control of moving a robot according to an operation force applied from an operating person to an operator and moving the operator according to a reactive force received by the robot from the outside. In this remote control system, the operating person can sense, via the operator, the reactive force acting on the robot, and therefore, can operate the operator while adjusting the reactive force acting on the robot.

CITATION LIST

Patent Document

Patent Document 1: Japanese Unexamined Patent Application Publication No. 2020-131411

SUMMARY OF THE INVENTION

The above-described remote control system is designed so that proper force control can be implement mainly for a reactive force according to a predetermined job. Thus, it may be difficult to implement proper force control for a reactive force outside a predetermined range or a reactive force which is within a predetermined range, but is close to the boundary of the range.

For example, in a case where the robot has contacted another object during movement and a small contact force acts as the reactive force on the robot, the force control for the operator may not be able to be implemented with desired responsiveness or stability. In this case, the occurrence of the contact of the robot is not properly notified to the operating person.

The technique disclosed here has been made in view of the above-described points, and an object thereof is to properly perform force control in both directions between an operator and a robot while properly notifying occurrence of contact of the robot to an operating person.

A remote control system of the present disclosure includes an operator to be operated by an operating person, a robot that moves according to operation on the operator, a haptic notifier that notifies occurrence of contact of the robot with an object to the operating person, and a controller that performs force control of moving the robot according to an operation force applied from the operating person to the operator and moving the operator according to a reactive force received by the robot from the outside and notification control of notifying the occurrence of the contact to the operating person via the haptic notifier if the robot contacts the object.

A remote control method of the present disclosure is a remote control method for controlling a robot via an operator, the remote control method including performing force control of moving the robot according to an operation force applied from an operating person to the operator and moving the operator according to a reactive force received by the robot from the outside, and notifying occurrence of contact to the operating person via a haptic notifier if the robot contacts an object.

A remote control program of the present disclosure is a remote control program causing a computer to implement a function of controlling a remote control system including an operator to be operated by an operating person and a robot that moves according to operation on the operator, the remote control program further causing the computer to implement a function of performing force control of moving the robot according to an operation force applied from the operating person to the operator and moving the operator according to a reactive force received by the robot from the outside, and a function of notifying occurrence of contact to the operating person via a haptic notifier if the robot contacts an object.

According to the above-described remote control system, the force control in both directions between the operator and the robot can be properly performed while the occurrence of the contact of the robot is properly notified to the operating person.

According to the above-described remote control method, the force control in both directions between the operator and the robot can be properly performed while the occurrence of the contact of the robot is properly notified to the operating person.

According to the above-described remote control program, the force control in both directions between the operator and the robot can be properly performed while the occurrence of the contact of the robot is properly notified to the operating person.

BRIEF DESCRIPTION OF THE DRAWINGS

FIG. 5 is a functional block diagram of the controller.

DESCRIPTION OF EMBODIMENTS

Figure 1:
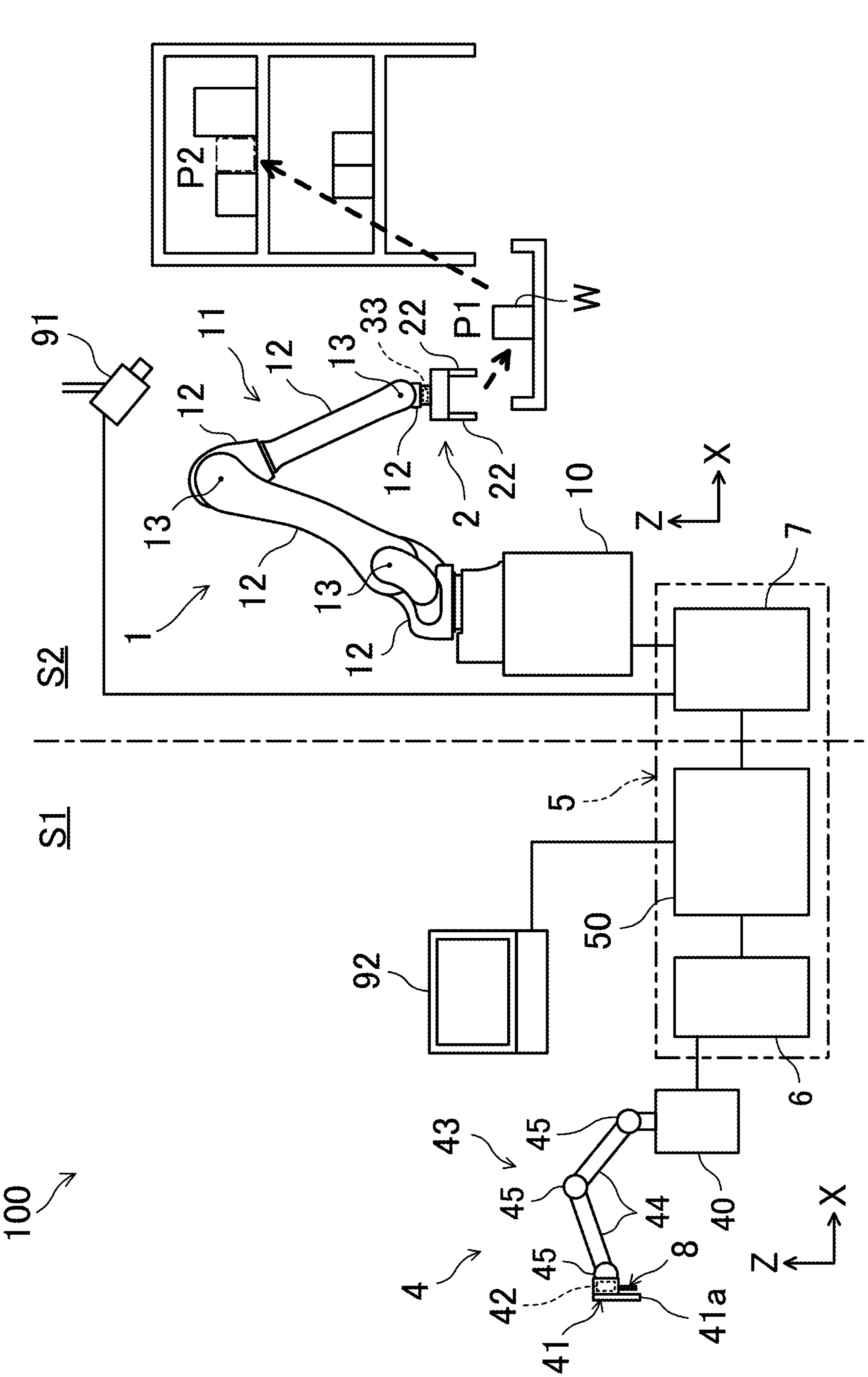
FIG. 1 is a schematic view showing the configuration of a remote control system.

Hereinafter, an exemplary embodiment will be described in detail with reference to the drawings. FIG. 1 is a schematic view showing the configuration of a remote control system 100.

The remote control system 100 has an operator 4 to be operated by an operating person, a robot 1 that moves according to operation on the operator 4, a haptic notifier 8 that notifies occurrence of contact of the robot 1 with an object to the operating person, and a controller 5 that controls the robot 1 and the operator 4. The operator 4 and the haptic notifier 8 are located at a first site S1 at which the operating person is present. The robot 1 is located at a second site S2 different from the first site S1. The controller 5 implements remote control between the operator 4 and the robot 1. The controller 5 performs force control of moving the robot 1 according to an operation force applied from the operating person to the operator 4 and moving the operator 4 according to a reactive force received by the robot 1 from the outside and notification control of notifying the occurrence of the contact to the operating person via the haptic notifier 8 if the robot 1 contacts the object.

The remote control system 100 may further include an imager 91 that captures an image of the robot 1 and a display 92 that presents the image of the robot 1 to the operating person. The imager 91 is located at the second site S2. The imager 91 is located in a fixed manner at the second site S2. The imager 91 outputs the captured image to the controller 5. Note that the imager 91 may be attached to a robot arm 11.

The display 92 is located at the first site S1. The display 92 is located at a position viewable while the operating person is operating the operator 4. The display 92 displays the image captured by the imager 91 and transmitted from the controller 5. The display 92 assists the operating person who is operating the operator 4 by displaying the captured image of the robot 1.

According to the remote control system 100, the operating person causes the robot 1 to perform a predetermined job by remotely operates the robot 1 via the operator 4. At this time, the imager 91 captures the image of the robot 1, and the display 92 displays the captured image. The operating person operates the operator 4 while checking the image of the robot 1 displayed on the display 92. In addition, if the robot 1 contacts the object, the operating person is notified of the contact of the robot 1 via the haptic notifier 8. The operating person remotely operates the robot 1 via the operator 4 while properly recognizing the occurrence of the contact of the robot 1.

Note that in the present disclosure, the job performed by the robot 1 does not include a teaching job and teaching confirmation and correction jobs. Thus, the operator 4 does not include a teaching pendant.

[Robot]

The robot 1 is an industrial robot. The robot 1 includes the robot arm 11 and a hand 2 having fingers 22 that perform opening-closing movement and coupled to the robot arm 11. For the robot 1, a robot coordinate system of three orthogonal axes is defined. For example, a Z axis is defined in the top-bottom direction, and an X axis and a Y axis are defined to be orthogonal to each other in the horizontal direction.

The robot arm 11 changes the position and posture of the hand 2. The robot arm 11 is a vertical articulated robot arm. The robot arm 11 has links 12, joints 13 connecting the links 12, servo motors 14 (see FIG. 4) that rotationally drive the joints 13, and encoders 31 (see FIG. 4) that detect the rotation positions of the servo motors 14. For example, the link 12 positioned at one end portion of the robot arm 11 is coupled to a base 10 via the joint 13 so as to rotate about a rotation axis extending in the vertical direction. Note that the robot arm 11 may be of a horizontal articulated type, a parallel link type, a Cartesian coordinate type, a polar coordinate type, or the like.

The hand 2 is an end effector of the robot arm 11. The hand 2 is coupled to the tip end of the robot arm 11. Specifically, the hand 2 is coupled to the link 12 at the end portion opposite to the link 12 coupled to the base 10 among the links 12. The hand 2 can be in various postures by movement of the robot arm 11.

Figure 2:
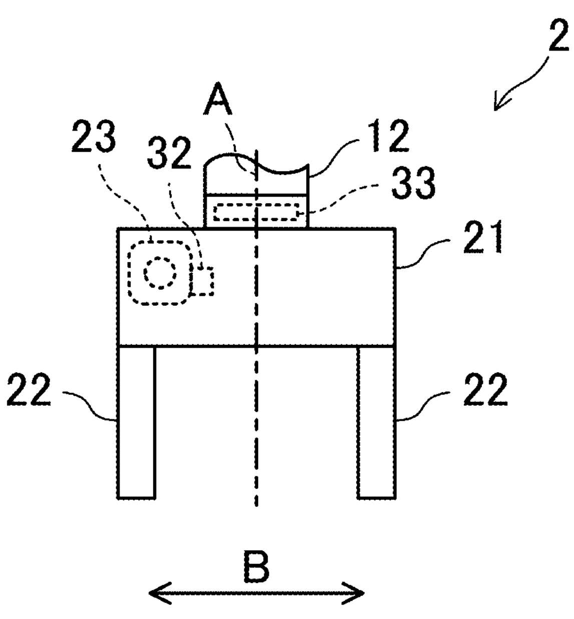
FIG. 2 is a schematic front view of a hand.

FIG. 2 is a schematic front view of the hand 2. The hand 2 has a hand body 21 and two fingers 22 disposed at the hand body 21. The hand body 21 is coupled to the link 12 of the robot arm 11 so as to rotate about a predetermined rotation axis A. The two fingers 22 are aligned in a predetermined opening-closing direction B. Specifically, the two fingers 22 are located symmetrically with respect to a center axis substantially orthogonal to the opening-closing direction B. In this example, the center axis is coincident with the rotation axis A. Hereinafter, the rotation axis A will also be referred to as a "center axis A." The two fingers 22 perform the opening-closing movement in the opening-closing direction B. The finger 22 extends in a direction crossing the opening-closing direction B. Specifically, the finger 22 extends substantially parallel with the center axis A. The hand 2 further has a servo motor 23 that causes the two fingers 22 to perform the opening-closing movement, and an encoder 32 that detects the rotation position of the servo motor 23.

The robot 1 has a contact force sensor 33 that detects a contact force acting on the robot 1 from the outside. As shown in FIG. 2, the contact force sensor 33 is disposed at the hand 2. Specifically, the contact force sensor 33 is disposed at a portion of the hand 2 coupled to the robot arm 11. Note that the position of the contact force sensor 33 is not limited to above. The contact force sensor 33 can be located at an arbitrary position at which the contact force acting on the robot 1 from the outside can be detected. The contact force sensor 33 detects a force at least in the direction of the center axis A between the two fingers 22, i.e., a force in the direction of the rotation axis A of the hand 2 relative to the link 12. The direction of the center axis A is a direction in which the hand 2 normally moves when gripping a workpiece. In this example, the contact force sensor 33 is a so-called force sensor. More specifically, the contact force sensor 33 is a force sensor that detects forces in orthogonal triaxial directions including the direction of the center axis A between the fingers 22 and moments about these triaxial directions.

The operator 4 has a handle 41 to be operated by the operating person and an operation force sensor 42 that detects an operation force applied from the operating person to the handle 41. The operator 4 receives input for manually operating the robot 1, and outputs operation information, which is input information, to the controller 5. Specifically, the operating person operates the operator 4 with gripping the handle 41. A force applied to the handle 41 at this time is detected by the operation force sensor 42. The operation force detected by the operation force sensor 42 is output as the operation information to the controller 5.

The operator 4 may further have a base 40 and a support 43 disposed on the base 40 to support the handle 41. For the operator 4, an operation coordinate system of orthogonal three axes is defined. The operation coordinate system corresponds to the robot coordinate system. That is, a Z axis is defined in the top-bottom direction, and an X axis and a Y axis are defined to be orthogonal to each other in the horizontal direction.

The support 43 has links 44, joints 45 connecting the links 44, servo motors 46 (see FIG. 4) that rotationally drive the joints 45, and encoders 47 (see FIG. 4) that detect the rotation positions of the servo motors 46. The support 43 supports the handle 41 such that the handle 41 is in an arbitrary posture at an arbitrary position in a three-dimensional space. The servo motor 46 rotates according to the position and posture of the handle 41. The rotation amount, i.e., rotation angle, of the servo motor 46 is uniquely determined.

In this example, the operation force sensor 42 is disposed between the handle 41 and the support 43 (specifically a coupling portion between the handle 41 and the support 43). In this example, the operation force sensor 42 is a so-called force sensor. More specifically, the operation force sensor 42 is a force sensor that detects forces in orthogonal triaxial directions and moments about these triaxial directions.

Note that the operation force detector is not limited to the operation force sensor 42. For example, the operation force sensor 42 may detect only forces in uniaxial, biaxial, or triaxial directions. Alternatively, the detector may be a current sensor that detects the current of the servo motor 46 of the support 43, a torque sensor that detects the torque of the servo motor 46, or the like.

[Haptic Notifier]

Figure 3:
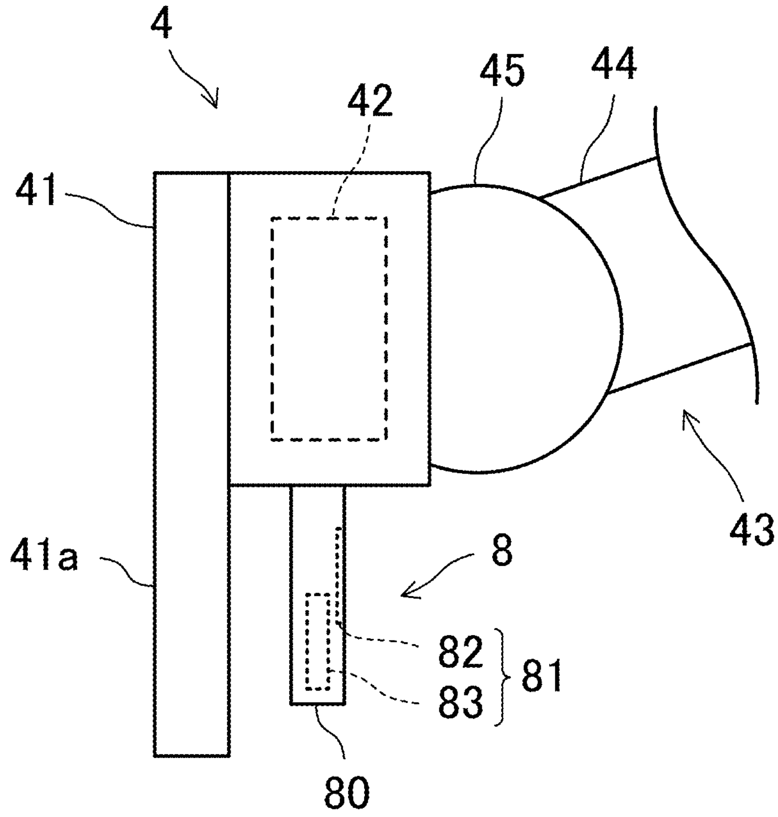
FIG. 3 is a schematic side view of a handle.

FIG. 3 is a schematic side view of the handle 41. The haptic notifier 8 notifies the occurrence of the contact of the robot 1 with the object by applying a stimulus to an operating person's sense of touch. In this example, the haptic notifier 8 is disposed at the operator 4. The handle 41 has a grip 41*a* to be gripped by the operating person. The haptic notifier 8 is disposed at the handle 41. The haptic notifier 8 is formed in a grippable shape such as a bar shape. The haptic notifier 8 is aligned with the grip 41*a* so as to be gripped by the operating person together with the grip 41*a*. Specifically, as viewed from the operating person, the grip 41*a* is on the near side and the haptic notifier 8 is on the far side, i.e., the grip 41*a* is located in back and the haptic notifier 8 is located in front.

The haptic notifier 8 has a bar-shaped body 80 and a vibration actuator 81 disposed in the body 80 to generate vibration. For example, the vibration actuator 81 is a voice coil motor. The haptic notifier 8 applies the stimulus to the operating person's sense of touch by the vibration of the vibration actuator 81. The vibration actuator 81 is one example of a vibration source.

The vibration actuator 81 includes a first vibration actuator 82 and a second vibration actuator 83. The first vibration actuator 82 and the second vibration actuator 83 are located at different positions in the body 80. Specifically, the first vibration actuator 82 is located in a portion of the body 80 opposite to the grip 41*a*, i.e., a portion of the body 80 farthest from the grip 41*a*. The second vibration actuator 83 is located in the body 80 at a position different from that of the first vibration actuator 82 by approximately 90 degrees in the circumferential direction about the center of the body 80.

The first vibration actuator 82 and the second vibration actuator 83 are located at the different positions, and therefore, vibration of the first vibration actuator 82 and vibration of the second vibration actuator 83 can be presented to the operating person in a distinguishable manner.

Further, the haptic notifier 8 can change its vibration mode. The vibration mode includes an amplitude, a frequency, a repetition period, a rhythm, and the like. For example, the haptic notifier 8 can adjust the amplitude, i.e., the magnitude of vibration, by adjusting current applied to the vibration actuator 81. The haptic notifier 8 can adjust the magnitude of vibration in two levels. The haptic notifier 8 can selectively generate a first vibration as relatively-small vibration and a second vibration greater than the first vibration. The first vibration and the second vibration may be continuous or intermittent. The vibration modes of the first vibration and the second vibration other than the amplitude may be the same as each other or different from each other. Note that in addition to or instead of the amplitude, the haptic notifier 8 may adjust the frequency of vibration.

[Controller]

The robot 1, the contact force sensor 33, the operator 4, the imager 91, the display 92, and the haptic notifier 8 are connected to the controller 5. The controller 5 controls the entirety of the remote control system 100, and controls movement of the robot 1 and the operator 4. Specifically, the controller 5 performs master-slave control, specifically bilateral control, between the robot 1 and the operator 4. The controller 5 performs first control of controlling movement of the robot 1 according to movement of the operator 4 by operation by the operating person and second control of controlling movement of the operator 4 such that the reactive force corresponding to a detection result of the contact force sensor 33 is presented to the operating person. For example, the first control causes the robot 1 to perform the job, and the second control presents the reactive force in the job to the operating person via the operator 4.

Figure 4:
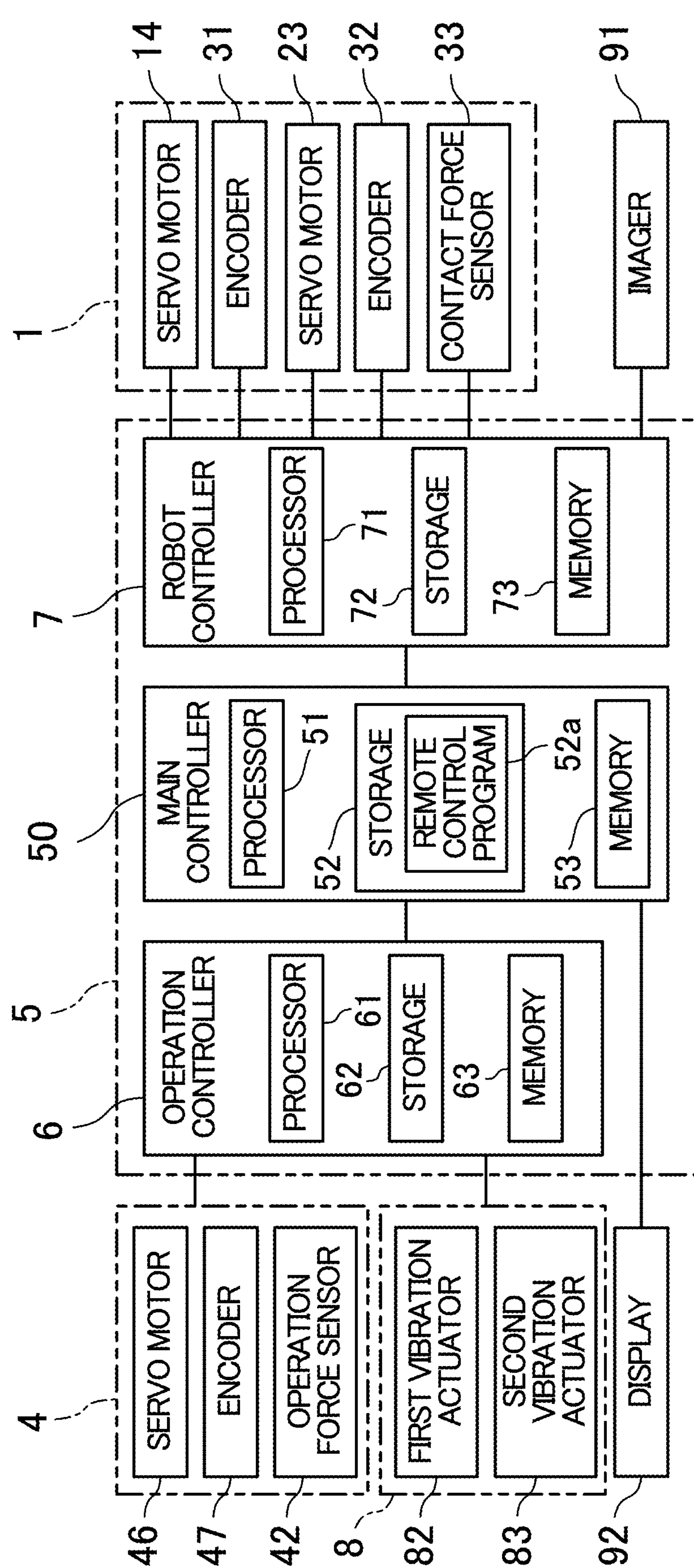
FIG. 4 is a diagram showing a schematic hardware configuration of a controller.

FIG. 4 is a diagram showing a schematic hardware configuration of the controller 5. The controller 5 has a main controller 50, an operation controller 6, and a robot controller 7. The main controller 50 transmits and receives information, commands, data, and the like to and from the operation controller 6 and the robot controller 7. The operation controller 6 controls the entirety of the operator 4. The robot controller 7 controls the entirety of the robot 1.

In the first control, the operation controller 6 receives a detection signal of the operation force sensor 42, and outputs the detection signal to the main controller 50. The main controller 50 generates a command based on the detection signal from the operation controller 6, and outputs the generated command to the robot controller 7. The robot controller 7 moves the robot 1 by controlling the servo motor 14 or the servo motor 23 based on the command from the main controller 50. The robot controller 7 receives a signal from the encoder 31 or the encoder 32, and performs feedback control on the servo motor 14 or the servo motor 23.

In the second control, the robot controller 7 receives a detection signal of the contact force sensor 33, and outputs the detection signal to the main controller 50. The main controller 50 generates a command based on the detection signal from the robot controller 7, and outputs the generated command to the operation controller 6. The operation controller 6 controls the servo motor 46 based on the command from the main controller 50 to move the support 43, and the operating person senses the reactive force accordingly. The operation controller 6 receives a signal from the encoder 47, and performs feedback control on the servo motor 46.

In parallel with the control of the robot 1 and the operator 4, the main controller 50 controls the haptic notifier 8 according to the status of the robot 1. Specifically, the main controller 50 determines the occurrence of the contact of the robot 1 with another object based on the detection signal of the contact force sensor 33, and notifies the occurrence of the contact of the robot 1 to the operating person's sense of touch via the haptic notifier 8. Further, the main controller 50 transmits the captured image, which is received from the imager 91, to the display 92.

In this manner, the controller 5 performs the control of the robot 1 and the operator 4, the presentation of the captured image, and the control of the haptic notifier 8 in parallel.

The main controller 50 has a processor 51, a storage 52, and a memory 53. The operation controller 6 has a processor 61, a storage 62, and a memory 63. The robot controller 7 has a processor 71, a storage 72, and a memory 73.

The processor 51 controls the entirety of the main controller 50. The processor 61 controls the entirety of the operation controller 6. The processor 71 controls the entirety of the robot controller 7. Each of the processor 51, the processor 61, and the processor 71 performs various types of arithmetic processing. For example, each of the processor 51, the processor 61, and the processor 71 is a processor such as a central processing unit (CPU). Each of the processor 51, the processor 61, and the processor 71 may be a micro controller unit (MCU), a micro processor unit (MPU), a field programmable gate array (FPGA), a programmable logic controller (PLC), a system LSI, or the like.

The storage 52 stores a program to be executed by the processor 51 and various types of data. The storage 62 stores a program to be executed by the processor 61 and various types of data. The storage 72 stores a program to be executed by the processor 71 and various types of data. Specifically, the storage 52 stores a remote control program 52*a*. Each of the storage 52, the storage 62, and the storage 72 is a non-volatile memory, a hard disc drive (HDD), a solid state drive (SSD), or the like.

Each of the memory 53, the memory 63, and the memory 73 temporarily stores data and the like. For example, each of the memory 53, the memory 63, and the memory 73 is a volatile memory.

FIG. 5 is a functional block diagram of the controller 5. The processor 61 of the operation controller 6 implements various functions by reading the program from the storage 62 and loading the program into the memory 63. Specifically, the processor 61 functions as an input processor 64 and a movement controller 65.

The input processor 64 outputs the information, data, commands, and the like, which are received from the operation force sensor 42, to the main controller 50. Specifically, the input processor 64 receives six-axis force detection signals from the operation force sensor 42, and outputs the detection signals to the main controller 50. Moreover, the input processor 64 receives the detection signal of the encoder 47 from the servo motor 46. The input processor 64 outputs such a detection signal to the movement controller 65 for feedback control on the support 43 by the movement controller 65.

The movement controller 65 receives a command position xdm from the main controller 50, and generates a control command for moving the support 43 according to the command position xdm. The movement controller 65 outputs the control command to the servo motor 46, and moves the support 43 and moves the handle 41 to a position corresponding to the command position. At this time, the movement controller 65 performs feedback control on movement of the support 43 based on the detection signal of the encoder 47 from the input processor 64. Accordingly, the reactive force is applied in response to the operation force applied to the handle 41 by the operating person. As a result, the operating person can operate the handle 41 while artificially sensing the reactive force received by the robot 1 via the handle 41.

The processor 71 of the robot controller 7 implements various functions by reading the program from the storage 72 and loading the program into the memory 73. Specifically, the processor 71 functions as an input processor 74 and a movement controller 75.

The input processor 74 outputs the information, data, commands, and the like, which are received from the encoder 31, the encoder 32, and the contact force sensor 33, to the main controller 50. Specifically, the input processor 74 receives six-axis force detection signals (hereinafter referred to as a "sensor signal") from the contact force sensor 33, and outputs the sensor signal to the main controller 50. Moreover, the input processor 74 receives the detection signals of the encoder 31 and the encoder 32. The input processor 74 outputs these detection signals to the movement controller 75 for feedback control on the robot arm 11 by the movement controller 75. Further, the input processor 74 outputs these detection signals as position information on the robot arm 11 to the main controller 50.

The movement controller 75 receives a command position xds from the main controller 50, and generates a control command for moving the robot arm 11 according to the command position xds. The movement controller 75 outputs the control command to the servo motor 14, and moves the robot arm 11 and moves the hand 2 to a position corresponding to the command position. At this time, the movement controller 75 performs feedback control on movement of the robot arm 11 based on the detection signal of the encoder 31 from the input processor 74. Moreover, the movement controller 75 causes the fingers 22 to perform the opening-closing movement by outputting the control command to the servo motor 23 of the hand 2.

The processor 51 of the main controller 50 implements various functions by reading the program (specifically the remote control program 52*a*) from the storage 52 and loading the program into the memory 53. Specifically, the processor 51 functions as an operation force acquirer 54, a contact force acquirer 55, an adder 56, a force-velocity converter 57, a first velocity-position converter 58, a second velocity-position converter 59, an image processor 510, and a notification controller 511.

The operation force acquirer 54 receives the detection signal of the operation force sensor 42 via the input processor 64, and acquires an operation force fm based on the detection signal. The operation force acquirer 54 inputs the operation force fm to the adder 56.

The contact force acquirer 55 receives the sensor signal of the contact force sensor 33 via the input processor 74, and acquires a contact force fs based on the sensor signal. The contact force acquirer 55 inputs the contact force fs to the adder 56. In addition, the contact force acquirer 55 outputs the sensor signal to the notification controller 511.

The adder 56 calculates the sum of the operation force fm input from the operation force acquirer 54 and the contact force fs input from the contact force acquirer 55. Here, the operation force fm and the contact force fs are forces in opposite directions, and for this reason, the positive and negative signs are different between the operation force fm and the contact force fs. The adder 56 outputs a resultant force fm+fs, which is the sum of the operation force fm and the contact force fs, to the force-velocity converter 57.

The force-velocity converter 57 converts the input resultant force fm+fs into a command velocity xd'. The force-velocity converter 57 calculates the command velocity xd' using a motion model based on a motion equation including an inertial coefficient, a viscosity coefficient (damper coefficient), and a stiffness coefficient (spring coefficient). Specifically, the force-velocity converter 57 calculates the command velocity xd' based on the following motion equation.

[Equation 1]

$$md \cdot xd'' + cd \cdot xd' + kd \cdot xd = fm + fs \quad (1)$$

where xd is a command position, md is an inertial coefficient, cd is a viscosity coefficient, kd is a stiffness coefficient, fm is an operation force, and fs is a contact force. Note that "'" indicates one-time differentiation and "''" indicates two-time differentiation.

Equation (1) is a linear differential equation, and when Equation (1) is solved for xd', Equation (2) is given.

[Equation 2]

$$xd' = A \tag{2}$$

where A is a term expressed by fm, fs, md, cd, kd, and the like.

Equation (2) is stored in the storage 52. The force-velocity converter 57 reads Equation (2) from the storage 52 to obtain the command velocity xd', and outputs the obtained command velocity xd' to the first velocity-position converter 58 and the second velocity-position converter 59.

The first velocity-position converter 58 converts, with reference to the robot coordinate system, the coordinate-converted command velocity xd' into the command position xds for the robot 1. For example, in a case where the ratio of the movement amount of the robot 1 to the movement amount of the operator 4 is set, the first velocity-position converter 58 obtains the command position xds by multiplying a command position xd, which is obtained from the command velocity xd', according to the movement amount ratio. The first velocity-position converter 58 outputs the obtained command position xds to the robot controller 7, specifically the movement controller 75. The movement controller 75 moves the robot arm 11 based on the command position xds, as described above.

The second velocity-position converter 59 converts, with reference to the operation coordinate system, the command velocity xd' into the command position xdm for the operator 4. The second velocity-position converter 59 outputs the obtained command position xdm to the operation controller 6, specifically the movement controller 65. The movement controller 65 moves the support 43 based on the command position xdm, as described above.

The image processor 510 transfers the image, i.e., an image signal, captured by and received from the imager 91 to the display 92. At this time, the image processor 510 may perform predetermined image processing on the captured image.

The notification controller 511 performs the notification control of notifying the occurrence of the contact to the operating person via the haptic notifier 8 if the robot 1 contacts the object. The notification controller 511 determines the occurrence of the contact of the robot 1 based on the contact force detected by the contact force sensor 33. The notification controller 511 performs the notification control if the contact force detected by the contact force sensor 33 is a predetermined upper limit or less, and stops the notification control when the contact force detected by the contact force sensor 33 exceeds the upper limit. Note that the force control is performed even in the range exceeding the upper limit.

Specifically, if the contact force is greater than a noise level and the upper limit or less, the notification controller 511 outputs an operation signal for the vibration actuator 81 to the haptic notifier 8. On the other hand, if the contact force is greater than the upper limit, the notification controller 511 does not output the operation signal for the vibration actuator 81. The operation signal is a signal for operating the vibration actuator 81. For example, in a case where the vibration actuator 81 is the voice coil motor, the operation signal is current to be supplied to the voice coil motor. Further, the notification controller 511 selectively uses a first operation signal and a second operation signal as the operation signal according to the magnitude of contact force. Specifically, the notification controller 511 outputs the first operation signal if the contact force is a threshold or less, and outputs the second operation signal if the contact force is greater than the threshold and is the upper limit or less. The threshold is a value smaller than the upper limit. The first operation signal is a command for generating the relatively-small vibration. The second operation signal is a command for generating the vibration greater than the vibration of the first operation signal.

While the hand 2 is gripping the workpiece, the notification controller 511 performs the notification control if a contact force increment from a contact force while the workpiece W is being gripped is the upper limit or less, and stops the notification control when the increment exceeds the upper limit.

Specifically, if the contact force is substantially constant for a predetermined period, the notification controller 511 regards such a contact force as a reference value, and compares the increment of the contact force from the reference value with the upper limit. For example, if a variation in the contact force during a period predetermined time back from the current point of time is a predetermined range or less, it may be determined that the contact force is substantially constant for the predetermined period. The latest contact force in this case is taken as the reference value. Alternatively, if the range of variation in the moving average of the contact force is a predetermined range or less, it may be determined that the contact force is substantially constant for the predetermined period. The moving average in this case is taken as the reference value. Note that the determination on whether or not the contact force is substantially constant for the predetermined period is not limited to above.

For example, in a case where the hand 2 is holding the workpiece W, the force of gravity of the workpiece W or the like acts as an external force on the robot 1, and may be detected as the contact force. As long as the holding of the workpiece W continues, the detection of the contact force also continues. If the contact force at this time exceeds the upper limit, the notification control is not performed. For example, if the robot arm 11, the hand 2, or the workpiece W contacts the object during delivery of the workpiece W and the robot 1 receives the contact force accordingly, occurrence of such contact is not notified to the operating person. By comparing the increment of the contact force with the upper limit or the like in a case where the contact force is substantially constant, the occurrence of the contact is determined not based on the absolute value of the contact force but based on the variation in the contact force. For example, if the robot 1 receives the contact force in a state of the hand 2 holding the workpiece W, the contact force increases from that in the substantially-constant state, and therefore, the occurrence of the contact of the robot 1 is notified to the operating person.

Further, the notification controller 511 determines the direction of the contact of the robot 1, and operates one of the first vibration actuator 82 or the second vibration actuator 83 corresponding to the direction of the contact force. Specifically, the notification controller 511 operates the first vibration actuator 82 based on the contact force in the direction of the center axis A between the fingers 22, and operates the second vibration actuator 83 based on the contact force in the direction orthogonal to the center axis A between the fingers 22. The notification controller 511 compares each of the contact force in the direction of the center axis A between the fingers 22 and the contact force in the direction orthogonal to the center axis A between the fingers 22 with the upper value or the threshold, as described above. Specifically, if the contact force in the direction of the center axis A between the fingers 22 is greater than the noise level and the upper limit or less, the notification controller 511 outputs the operation signal for the first vibration actuator 82 to the haptic notifier 8. On the other hand, if the contact force in the direction of the center axis A between the fingers 22 is greater than the upper limit, the notification controller 511 does not output the operation signal for the first vibration actuator 82. If the contact force in the direction orthogonal to the center axis A between the fingers 22 is greater than the noise level and the upper limit or less, the notification controller 511 outputs the operation signal for the second vibration actuator 83 to the haptic notifier 8. On the other hand, if the contact force in the direction orthogonal to the center axis A between the fingers 22 is greater than the upper limit, the notification controller 511 does not output the operation signal for the second vibration actuator 83. Further, for the first vibration actuator 82 and the second vibration actuator 83, the notification controller 511 selectively uses the above-described first and second operation signals based on the magnitude of contact force.

In this manner, the notification controller 511 operates the vibration actuator 81 if the contact of the robot 1 with a relatively-small contact force, i.e., a contact force of the upper limit or less, is detected. On the other hand, the notification controller 511 does not operate the vibration actuator 81 if the contact force of the robot 1 is relatively great, i.e., greater than the upper limit. At this time, the notification controller 511 changes the magnitude of vibration by the vibration actuator 81 according to the magnitude of contact force. Further, the notification controller 511 selectively uses the first vibration actuator 82 and the second vibration actuator 83 according to the direction of the contact of the robot 1. In a case where the contact force is kept substantially constant, operation of the vibration actuator 81 is determined by comparing the increment of the contact force with the upper limit or the like.

[Operation of Remote Control System]

Figure 6:
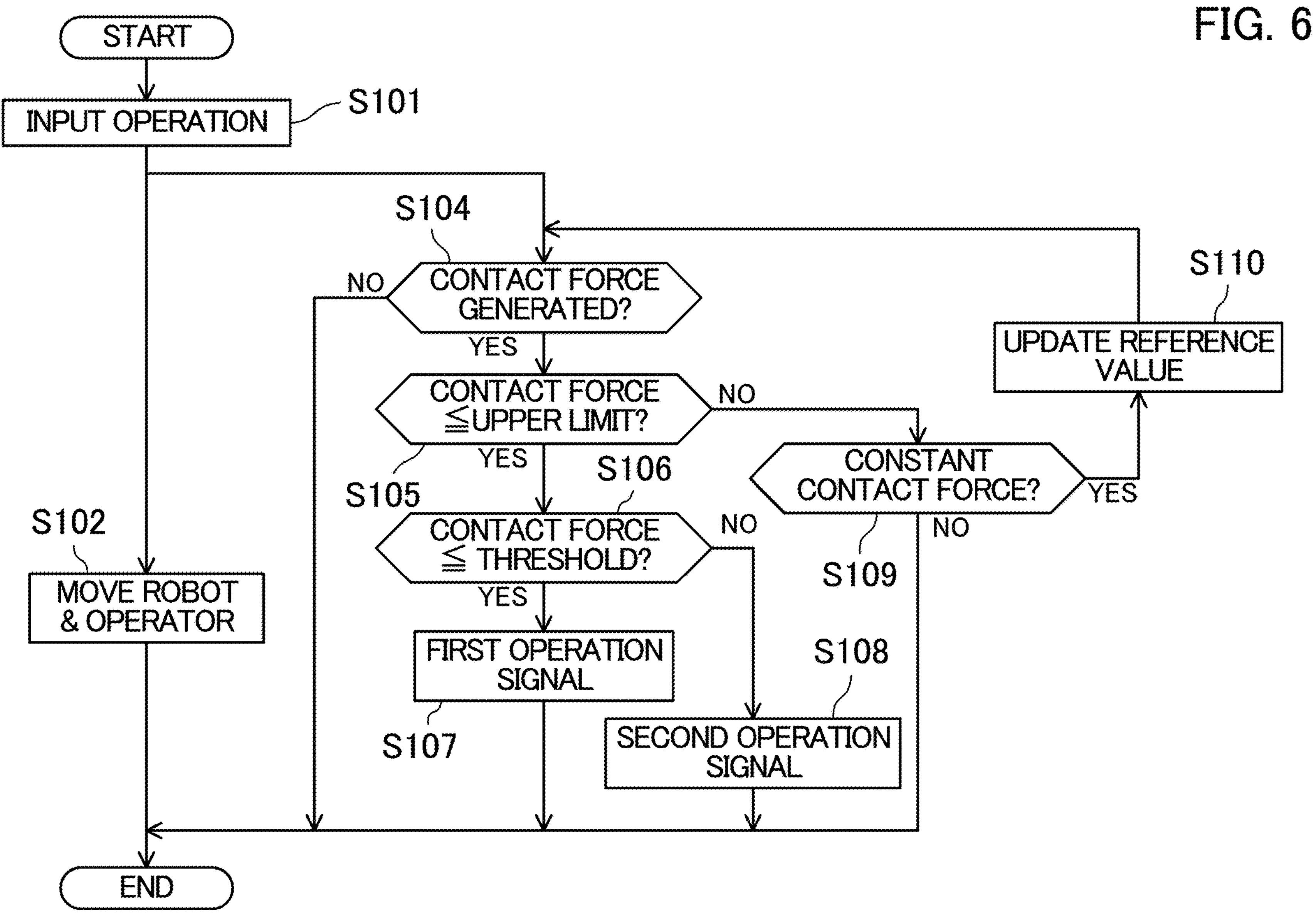
FIG. 6 is a flowchart showing operation of the remote control system.

The remote control by the remote control system 100 will be described. FIG. 6 is a flowchart showing operation of the remote control system 100. The remote control is implemented in such a manner that the controller 5 reads the remote control program 52*a* from the storage 52 and loads such a program into the memory 53. In the remote control, the image of the robot 1 captured by the imager 91 is displayed on the display 92. The user operates the operator 4 while viewing the image of the robot 1 displayed on the display 92.

First, in Step S101, when the operating person operates the operator 4, the operation force applied by the operating person via the handle 41 is detected by the operation force sensor 42. The input processor 64 inputs the operation force detected by the operation force sensor 42 as the detection signal to the main controller 50. In the main controller 50, the operation force acquirer 54 inputs the operation force fm based on the detection signal to the adder 56.

If the contact force sensor 33 detects the contact force, the detected contact force is input as the sensor signal to the input processor 74. The sensor signal input to the input processor 74 is input to the main controller 50.

Next, in Step S102, the main controller 50 moves the robot 1 according to the operation via the operator 4, and moves the operator 4 according to the contact force of the robot 1. Specifically, the adder 56 obtains the resultant force fm+fs based on the input operation force fm and contact force fs, and inputs the resultant force fm+fs to the force-velocity converter 57. The force-velocity converter 57 obtains the command velocity xd' using the resultant force fm+fs based on Equation (2).

For the robot 1, the first velocity-position converter 58 obtains the command position xds from the command velocity xd'. The movement controller 75 of the robot controller 7 moves the robot arm 11 according to the command position xds, and controls the position of the hand 2. Accordingly, the hand 2 moves according to the operation force fm. For the operator 4, the second velocity-position converter 59 obtains the command position xdm from the command velocity xd'. The movement controller 65 of the operation controller 6 moves the support 43 according to the command position xdm, and controls the position of the handle 41. Accordingly, the operating person senses the reactive force corresponding to the contact force fs. Step S102 is equivalent to performing the force control of moving the robot according to the operation force applied from the operating person to the operator and moving the operator according to the reactive force received by the robot from the outside.

Upon completion of the processing of Step S102, the processor 51 ends the control for one cycle. The processor 51 repeats the processing of Steps S101, S102 in a predetermined control cycle. Accordingly, in response to the operation on the operator 4 by the operating person at the first site S1, the robot 1 continuously moves at the second site S2. Meanwhile, the operating person can operate the operator 4 while sensing the reactive force received by the hand 2 from the outside via the operator 4.

For example, as shown in FIG. 1, in a case where a transport job of transporting the workpiece W from a start position P1 to a predetermined target position P2 is performed, the operating person first moves the robot arm 11 such that the hand 2 moves to the start position P1 of the workpiece W. Then, the operating person causes the hand 2 to grip the workpiece W at the start position P1. Next, the operating person moves the robot arm 11 such that the workpiece W gripped with the hand 2 moves to the target position P2. Finally, the operating person causes the hand 2 to release the workpiece W at the target position P2. Such a transport job is implemented by repetition of Steps S101, S102 described above.

The remote control system 100 performs the haptic notification in parallel with the force control. Specifically, after the operating person has operated the operator 4 in Step S101, the notification controller 511 performs the processing of Step S104 in parallel with Step S102. In Step S104, the notification controller 511 determines whether or not the contact force is generated. At this time, the notification controller 511 uses, for the determination, the contact force obtained by subtracting the reference value from the contact force actually detected by the contact force sensor 33. The subtraction of the reference value is processing for eliminating the influence of the contact force generated continuously, and is so-called contact force zero-point correction. Since the initial value of the reference value is zero, the notification controller 511 directly uses the contact force actually detected by the contact force sensor 33 immediately after the start of the remote control to determine the generation of the contact force. Further, the notification controller 511 separately evaluates the contact force (hereinafter referred to as an "axial contact force") in the direction of the center axis A between the fingers 22 and the contact force (hereinafter referred to as an "orthogonal contact force") in the direction orthogonal to the center axis A between the fingers 22. That is, the notification controller 511 uses values obtained by subtracting the reference value from each of the axial contact force and the orthogonal contact force to determine whether or not each of the axial contact force and the orthogonal contact force is generated. The following determination and processing are also performed on each of the axial contact force and the orthogonal contact force.

If the contact force is greater than the noise level, the notification controller 511 determines that the contact force is generated, and the processing proceeds to Step S105. On the other hand, if the contact force is the noise level or less, the notification controller 511 determines that no contact force is generated, and the processing related to the haptic notification ends in this cycle.

In Step S105, the notification controller 511 determines whether or not the contact force is the upper limit or less. If the contact force is the upper limit or less, the notification controller 511 determines, in Step S106, whether or not the contact force is the threshold or less. If the contact force is the threshold or less, the notification controller 511 outputs the first operation signal to the haptic notifier 8 in Step S107. If the contact force is greater than the threshold, the notification controller 511 outputs the second operation signal to the haptic notifier 8 in Step S108. Here, if the axial contact force satisfies the condition, the notification controller 511 outputs the first operation signal or the second operation signal to the first vibration actuator 82 of the haptic notifier 8. If the orthogonal contact force satisfies the condition, the notification controller 511 outputs the first operation signal or the second operation signal to the second vibration actuator 83 of the haptic notifier 8. Steps S107, S108 are equivalent to notifying the occurrence of the contact to the operating person via the haptic notifier if the robot contacts the object.

On the other hand, if the contact force is greater than the upper limit in Step S105, the notification controller 511 determines, in Step S109, whether or not the contact force is substantially constant for the predetermined period. For example, the notification controller 511 determines whether or not the variation in the moving average of the contact force in the predetermined period is within the predetermined determination range. If the variation in the moving average of the contact force is within the determination range, the notification controller 511 determines that the contact force is substantially constant for the predetermined period, and in Step S110, updates the reference value to the moving average of the contact force at the current point of time. Thereafter, the notification controller 511 performs the processing of Step S104 again. In Step S104 performed again, since the reference value has been updated, the notification controller 511 determines the generation of the contact force based on the contact force obtained by subtracting the reference value from the contact force actually detected by the contact force sensor 33. That is, the notification controller 511 determines the generation of the contact force based on the increment of the contact force from the reference value. If the increment of the contact force from the reference value is the noise level or less, the notification controller 511 determines that no contact force is generated.

On the other hand, if the increment of the contact force from the reference value is greater than the noise level, the notification controller 511 determines that the contact force is generated. Thereafter, the notification controller 511 performs the determination of Steps S105, S106 based on the increment of the contact force from the reference value. Note that when updating the reference value in Step S110, the notification controller 511 updates the reference value not to the moving average of the increment of the contact force from the reference value but to the moving average of the contact force detected by the contact force sensor 33.

In this manner, the remote control system 100 performs the force control and the notification control independently of each other. For example, in a case where the above-described transport job is performed, the operating person first operates the operator 4 to move the hand 2 to the start position P1 of the workpiece W. At the start position P1 of the workpiece W, the position of the hand 2 is adjusted such that the workpiece W is located between the two fingers 22.

At this time, the fingers 22 may contact the workpiece W or a surface (hereinafter referred to as a "mounting surface") on which the workpiece W is placed. When the fingers 22 contacts the workpiece W or the like, the contact force sensor 33 detects the contact force. Since the reference value at this time is zero, the contact force detected by the contact force sensor 33 is directly used for the determination of Step S104.

For example, if the fingers 22 contact the mounting surface with the relatively-small contact force and the contact force sensor 33 detects an axial contact force of greater than the noise level and the threshold or less, the notification controller 511 outputs the first operation signal to the first vibration actuator 82 of the haptic notifier 8 (Step S107). The first vibration actuator 82 generates the relatively-small vibration corresponding to the first operation signal. When recognizing the contact of the fingers 22 with the mounting surface, the operating person adjusts the position of the hand 2 to such a position that the hand 2 can grip the workpiece W while avoiding pressing of the fingers 22 against the mounting surface more than necessary. At this time, when the pressing of the fingers 22 against the mounting surface becomes stronger, the contact force may become greater than the threshold and the upper limit or less. In this case, the notification controller 511 outputs the second operation signal to the first vibration actuator 82 of the haptic notifier 8 (Step S108). The first vibration actuator 82 generates the relatively-great vibration corresponding to the second operation signal. By changing the magnitude of vibration, the operating person recognizes that the contact force of the fingers 22 with the mounting surface becomes greater. The operating person adjusts the position of the hand 2 while paying attention not to increase the contact force.

Upon completion of the movement of the hand 2 to the start position P1 of the workpiece W, the operating person causes, by operating the operator 4, the fingers 22 of the hand 2 to perform the closing movement and causes the hand 2 to grip the workpiece W. In this gripping step, almost no contact force is generated.

Upon completion of the gripping of the workpiece W with the hand 2, the operating person moves, by operating the operator 4, the hand 2 and the workpiece W to the target position P2. Upon the transport of the workpiece W, the weight of the workpiece W itself acts on the hand 2, and therefore, the contact force sensor 33 may detect the contact force depending on the posture of the hand 2 or the like. The contact force due to the weight of the workpiece W itself or the like is compared with the threshold and the upper limit, and as necessary, the haptic notifier 8 may be operated. If the contact force due to the weight of the workpiece W itself or the like is greater than the upper limit, the haptic notification by the haptic notifier 8 is not performed.

If the contact force due to the weight of the workpiece W itself or the like is greater than the upper limit and is kept substantially constant, the reference value of the contact force is updated (Step S100). After the updating of the reference value, the increment of the contact force from the reference value is compared with the threshold or the upper limit in Step S105 or Step S106.

In this example, the workpiece W is delivered laterally to the target position P2. At this time, in some cases, other workpieces W have already been placed at the target position P2, and the workpiece W gripped with the hand 2 may be pushed and inserted between the workpieces W. When the fingers 22, the workpiece W, or the like contact(s) the mounting surface for the workpiece W, i.e., the surface on which the workpiece W is to be placed, or another workpiece W, the contact force detected by the contact force sensor 33 changes. At this time, if the increment of the contact force from the reference value is greater than the noise level and the upper limit or less, the notification controller 511 outputs the first operation signal or the second operation signal to the haptic notifier 8 (Step S107 or Step S108). In the haptic notifier 8, the vibration actuator corresponding to the direction of the contact force vibrates. The operating person adjusts the position of the workpiece W to such a position that the workpiece W can be inserted between the workpieces W while grasping the status of the contact of the hand 2 or the workpiece W.

When the workpiece W reaches the insertable position, the operating person pushes the workpiece W between the workpieces W by operating the operator 4. The hand 2 pushes the workpiece W in the direction of the center axis A between the fingers 22. At this time, a friction force with the workpieces W or the mounting surface for the workpiece W is generated on the workpiece W. The friction force upon the pushing may be detected as the axial contact force by the contact force sensor 33. The contact force upon the pushing tends to be relatively great and exceed the upper limit. In this case, the haptic notification based on the contact force upon the pushing is not performed. On the other hand, even if the contact force is great, the force control is performed. The processor 51 moves the operator 4 according to the contact force upon the pushing, and the reactive force is presented to the operating person accordingly. The operating person pushes the workpiece W to the target position P2 while sensing the contact force, i.e., the friction force, generated on the workpiece W. When the workpiece W reaches the target position P2, the operating person causes the hand 2 to release the workpiece W. When the workpiece W is released, the transport job is completed.

In this manner, the processor 51 performs the force control and the haptic notification in parallel. That is, the processor 51 moves the operator 4 according to the contact force detected by the contact force sensor 33 and presents the reactive force to the operating person while moving the robot 1 according to the operation on the operator 4 by the operating person. At this time, if the contact force is relatively small, the processor 51 notifies the operating person of the occurrence of the contact of the robot 1 by the vibration of the haptic notifier 8.

The force control can also be performed in the contact force range targeted for the haptic notification. Thus, the occurrence of the contact of the robot 1 can also be notified to the operating person by the presentation of the reactive force via the operator 4. However, movement of the robot 1 applying the force to the workpiece W is assumed for the force control. The contact of the robot 1 in a job of intentionally pressing the workpiece W is greater than accidental contact of the robot 1 with another object. A force control system is designed such that an initial responsiveness or stability is obtained for a relatively-wide range of contact force to a great value. Thus, in the force control, the accidental contact of the robot 1 with another object may not be able to be properly presented as the reactive force to the operating person. Further, even if the operation reactive force becomes slightly greater, resistance in the operation becomes only slightly greater and it is difficult for the operating person to recognize such a change.

On the other hand, the processor 51 performs the haptic notification separately from the reactive force presentation in the force control. With this configuration, even if the contact force is small, the occurrence of the contact of the robot 1 can be properly notified to the operating person. Moreover, the processor 51 performs the haptic notification independently of the force control. That is, the haptic notification is performed without influencing the force control. The contact force range targeted for the force control, the responsiveness, and the stability are not influenced by the haptic notification. Conversely, the haptic notification is also not influenced by the force control. Thus, a haptic notification control system can be designed focusing on the target small contact force. That is, the haptic notification properly notifies the target small contact force to the operating person's sense of touch.

Further, in the haptic notification, the contact of the robot 1 is presented by the vibration, and therefore, the operating person easily senses the contact as compared to the operation reactive force. The magnitude of vibration of the haptic notifier 8 is not proportional to the magnitude of contact force of the robot 1, and is set in a stepwise manner for the magnitude of contact force. That is, it does not mean that when the contact force decreases, the magnitude of vibration decreases in proportion to such a decrease. Even the small contact force is presented as vibration with a certain magnitude to the operating person. Thus, the contact of the robot 1 with the small contact force can also be properly notified to the operating person.

In the haptic notification, the magnitude of vibration increases in a stepwise manner according to the magnitude of contact force, and therefore, the magnitude of contact force can also be notified to the operating person.

In addition, the vibration mode of the haptic notifier 8 is changed according to the direction of the contact force, and therefore, the direction of the contact force can be notified to the operating person. In this example, the vibrating portion of the haptic notifier 8 is changed as the vibration mode according to the direction of the contact force.

As described above, the remote control system 100 according to a first aspect of the technique of the present disclosure includes the operator 4 to be operated by the operating person, the robot 1 that moves according to the operation on the operator 4, the haptic notifier 8 that notifies the occurrence of the contact of the robot 1 with the object to the operating person, and the controller 5 that performs the force control of moving the robot 1 according to the operation force applied from the operating person to the operator 4 and moving the operator 4 according to the reactive force received by the robot 1 from the outside and the notification control of notifying the occurrence of the contact to the operating person via the haptic notifier 8 if the robot 1 contacts the object.

According to this configuration, the force control of moving the robot 1 via the operator 4 and moving the operator 4 according to the reactive force received by the robot 1 is performed. In addition, the occurrence of the contact of the robot 1 with another object is notified to the operating person via the haptic notifier 8. The occurrence of the contact of the robot 1 is notified to the operating person via the haptic notifier 8 separately from the reactive force presentation to the operator 4, and therefore, the operating person can properly recognize the occurrence of the contact of the robot 1.

A second aspect of the technique of the present disclosure is the remote control system 100 according to the first aspect, in which the controller 5 performs the force control and the notification control independently of each other.

According to this configuration, the notification control can be performed separately from the force control, i.e., without influencing the force control. As a result, both the force control and the notification control can be properly performed.

A third aspect of the technique of the present disclosure is the remote control system 100 according to the first or second aspect, in which the robot 1 has the contact force sensor 33 that detects the contact force acting on the robot 1 from the outside, and the controller 5 uses the contact force detected by the contact force sensor 33 for the force control, and determines the occurrence of the contact of the robot 1 based on the contact force detected by the contact force sensor 33 in the notification control.

According to this configuration, the contact force detected by the contact force sensor 33 of the robot 1 is used for both the force control and the notification control. The contact force sensor 33 is shared so that the number of components can be reduced.

A fourth aspect of the technique of the present disclosure is the remote control system 100 according to the third aspect, in which the controller 5 performs the notification control if the contact force detected by the contact force sensor 33 is the predetermined upper limit or less, and stops the notification control if the contact force detected by the contact force sensor 33 exceeds the upper limit.

According to this configuration, the notification control is performed if the contact force is relative small, and is not performed if the contact force is relatively great. It is difficult to transmit the relatively-small contact force to the operating person in the reactive force presentation by the force control. That is, the contact with the relatively-small contact force, which is difficult to be transmitted to the operating person in the reactive force presentation, can be properly notified to the operating person.

A fifth aspect of the technique of the present disclosure is the remote control system 100 according to the fourth aspect, in which the controller 5 performs the force control in a range in which the contact force detected by the contact force sensor 33 exceeds the upper limit.

According to this configuration, the force control can be performed when the relatively-great contact force is generated. That is, the range of the contact force targeted for the force control is expanded to the greater contact force side as compared to the range of the contact force targeted for the notification control. In a case where the contact force is relatively great, the reactive force presented by the force control is also great, and therefore, the operating person easily recognizes the occurrence of the contact. At this time, the notification control is stopped, and therefore, this can prevent the notification control from influencing the force control. That is, the operating person can properly recognize the reactive force via the operator 4.

A sixth aspect of the technique of the present disclosure is the remote control system 100 according to the fourth or fifth aspect, in which the robot 1 has the hand 2 that holds the workpiece W, and while the hand 2 is gripping the workpiece W, the controller 5 performs the notification control if the increment of the contact force detected by the contact force sensor 33 from the reference value is the upper limit or less with the contact force due to the gripping of the workpiece W as the reference value, and stops the notification control when the increment of the contact force detected by the contact force sensor 33 from the reference value exceeds the upper limit.

According to this configuration, even if the contact of the robot 1 occurs with the hand 2 holding the workpiece W, the occurrence of the contact can be properly notified to the operating person. Specifically, while the hand 2 is gripping the workpiece W, the contact force due to the gripping of the workpiece W continuously acts on the robot 1. The notification control is performed based on the increment of the contact force from the reference value with the contact force due to the gripping of the workpiece W as the reference value. In this manner, the occurrence of the contact of the robot 1 can be notified to the operating person with a state of the hand 2 gripping the workpiece W as a reference.

A seventh aspect of the technique of the present disclosure is the remote control system 100 according to any one of the first to sixth aspects, in which the haptic notifier 8 applies the stimulus to the operating person's sense of touch to notify the occurrence of the contact of the robot 1 with the object.

According to this configuration, the operating person can easily recognize the occurrence of the contact of the robot 1 as compared to a case where the contact of the robot 1 is presented by the reactive force via the operator 4.

An eighth aspect of the technique of the present disclosure is the remote control system 100 according to the seventh aspect, in which the haptic notifier 8 has the vibration actuator 81 (vibration source) that generates the vibration, and in the notification control, the controller 5 causes the haptic notifier 8 to generate the vibration if the robot 1 contacts the object.

According to this configuration, the operating person is notified of the occurrence of the contact of the robot 1 by the vibration of the haptic notifier 8. The operating person easily sense the contact by the vibration as compared to the operation reactive force via the operator 4. That is, the operating person can easily recognize the occurrence of the contact of the robot 1. Further, even when the reactive force is presented to the operator 4 by the force control, the operating person can easily recognize the occurrence of the contact of the robot 1 by the vibration of the haptic notifier 8.

The remote control method for controlling the robot 1 via the operator 4 according to a ninth aspect of the technique of the present disclosure includes the performing the force control of moving the robot 1 according to the operation force applied from the operating person to the operator 4 and moving the operator 4 according to the reactive force received by the robot 1 from the outside, and the notifying the occurrence of the contact to the operating person via the haptic notifier 8 if the robot 1 contacts the object.

The remote control program according to a tenth aspect of the technique of the present disclosure is the remote control program causing the processor 51 (computer) to implement the function of controlling the remote control system 100 including the operator 4 to be operated by the operating person and the robot 1 that moves according to the operation on the operator 4, the remote control program further causing the processor 51 to implement the function of performing the force control of moving the robot 1 according to the operation force applied from the operating person to the operator 4 and moving the operator 4 according to the reactive force received by the robot 1 from the outside, and the function of notifying the occurrence of the contact to the operating person via the haptic notifier 8 if the robot 1 contacts the object.

According to the configuration of the ninth or tenth aspect, the force control of moving the robot 1 via the operator 4 and moving the operator 4 in response to the reactive force received by the robot 1 is performed. In addition, the occurrence of the contact of the robot 1 with another object is notified to the operating person via the haptic notifier 8. The occurrence of the contact of the robot 1 is notified to the operating person via the haptic notifier 8 separately from the reactive force presentation to the operator 4, and therefore, the operating person can properly recognize the occurrence of the contact of the robot 1.

Other Embodiments

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

The above-described configuration of the remote control system 100 is merely one example, and the present disclosure is not limited thereto. For example, the job performed by the robot 1 is not limited to the transport job. The job performed by the robot 1 may be a processing job. Moreover, the end effector of the robot arm 11 is not limited to the hand 2. The end effector may be changed according to the job performed by the robot 1.

The robot 1 is not limited to the industrial robot. For example, the robot 1 may be a medical robot. Alternatively, the robot 1 may be a movement manipulator or a humanoid robot.

The contact force sensor 33 that detects the contact force acting on the robot 1 from the outside is not limited to the force sensor. For example, the contact force sensor may be the encoder 31, a current sensor that detects the current of the servo motor 14 of the robot arm 11, or a torque sensor that detects the torque of the servo motor 14. The contact force acting on the robot 1 from the outside may be obtained based on a deviation between the current rotation position and target rotation position of the servo motor 14, a deviation between the current and target values of the current, or a deviation between the current and target values of the torque.

The haptic notifier 8 is not limited to the above-described configuration. As long as the haptic notifier 8 can apply the stimulus to the user's sense of touch, the haptic notifier 8 may be attached to the user in an arbitrary form. For example, the haptic notifier 8 may be formed integrally with the grip 41*a*. That is, the vibration actuator 81 may be built in the grip 41*a*. Note that the operator 4 is not limited to the above-described configuration, and therefore, the configuration of the haptic notifier 8 may also be changed according to the configuration of the operator 4.

Alternatively, the haptic notifier 8 may be separated from the operator 4. For example, the haptic notifier 8 may be attached to the operating person. Specifically, the haptic notifier 8 may be a wrist band including the built-in vibration actuator 81 and attached to the wrist of the operating person.

The vibration source of the haptic notifier 8 is not limited to the voice coil motor. The vibration source may be of an eccentric rotating mass type or a piezo type.

The number of vibration actuators 81 of the haptic notifier 8 is not limited to two. One vibration actuator 81 or three or more vibration actuators 81 may be disposed. The type of contact of the robot 1 may be notified to the user by changing the combination of vibration actuators according to various types of contact of the robot 1. For example, the type of contact of the robot 1 may be notified to the user in a distinguishable manner by a technique using haptic illusion.

The vibration of each vibration actuator 81 is not limited to the first vibration and the second vibration. The vibration of each vibration actuator 81 may be of one type or three or more types.

The block diagram described above is one example, and blocks may be implemented as one block, one block may be divided into blocks, or some functions may be transferred to another block.

The technique of the present disclosure may be a non-transitory computer-readable storage medium storing the remote control program 52*a*. Moreover, the remote control program 52*a* may be distributed via a transmission medium such as the Internet.

The flowchart is merely one example. Changes, replacements, additions, omissions, etc. may be made to the steps of the flowchart as necessary. Moreover, the order of steps in the flowchart may be changed, or the processing performed in series may be performed in parallel.

The functions implemented by the components described in the present specification may be implemented on a circuitry or a processing circuitry including a versatile processor, an application specific processor, an integrated circuit, an application specific integrated circuit (ASIC), a central processing unit (CPU), a conventional circuit, and/or a combination thereof and programmed to implement the above-described functions. A processor includes a transistor and other circuits, and is taken as a circuitry or a processing circuitry. The processor may be a programmed processor that executes a program stored in a memory.

In the present specification, a circuitry, a unit, or means is hardware programmed to implement the above-described functions or configured to execute the above-described functions. The hardware is any type of hardware disclosed in the present embodiment or known hardware programmed to implement the above-described functions or configured to execute the above-described functions.

In a case where the hardware is a processor of a circuitry type, a circuitry, means, or a unit is a combination of hardware and software used for configuring hardware and/or a processor.

The invention claimed is:

1. A remote control system comprising:

an operator to be operated by an operating person;

a robot that moves according to operation on the operator, the robot having a contact force sensor that detects a contact force acting on the robot from outside;

a haptic notifier that notifies occurrence of contact of the robot with an object to the operating person; and a controller that performs (i) force control of moving the robot according to an operation force applied from the operating person to the operator and moving the operator according to a reactive force received by the robot from the outside and (ii) notification control of notifying the occurrence of the contact to the operating person via the haptic notifier if the robot contacts the object, wherein the controller uses the contact force detected by the contact force sensor for the force control, determines the occurrence of the contact of the robot based on the contact force detected by the contact force sensor in the notification control, performs the notification control if the contact force detected by the contact force sensor is a predetermined upper limit or less, and performs no notification control with the haptic notifier if the contact force detected by the contact force sensor exceeds the upper limit.

2. The remote control system of claim 1, wherein the controller performs the force control and the notification control independently of each other.

3. The remote control system of claim 1, wherein the controller performs the force control in a range in which the contact force detected by the contact force sensor exceeds the upper limit.

4. The remote control system of claim 1, wherein the robot has a hand that holds a workpiece, and while the hand is gripping the workpiece, the controller performs the notification control if an increment of the contact force detected by the contact force sensor from a reference value is the upper limit or less, a contact force due to gripping of the workpiece being the reference value, and stops the notification control when the increment of the contact force detected by the contact force sensor from the reference value exceeds the upper limit.

5. The remote control system of claim 1, wherein the haptic notifier applies a stimulus to an operating person's sense of touch to notify the occurrence of the contact of the robot with the object.

6. The remote control system of claim 5, wherein the haptic notifier has a vibration source that generates vibration, and in the notification control, the controller causes the haptic notifier to generate the vibration if the robot contacts the object.

7. A remote control method for controlling a robot via an operator, comprising:

performing force control of moving the robot according to an operation force applied from an operating person to the operator and moving the operator according to a reactive force received by the robot from an outside; and performing notification control of notifying occurrence of contact to the operating person via a haptic notifier if the robot contacts an object wherein the force control uses contact force acting on the robot from the outside that is detected by a contact force sensor of the robot, the occurrence of the contact of the robot is determined in the notification control based on the contact force detected by the force sensor, the notification control is performed if the contact force detected by the contact force sensor is a predetermined upper limit or less, and no notification control is performed with the haptic notifier if the contact force detected by the contact force sensor exceeds the upper limit.

8. A non-transitory computer-readable storage medium storing a remote control program causing a computer to implement a function of controlling a remote control system including an operator to be operated by an operating person and a robot that moves according to operation on the operator, the remote control program further causing the computer to implement a function of performing force control of moving the robot according to an operation force applied from the operating person to the operator and moving the operator according to a reactive force received by the robot from outside, and a function of performing notification control of notifying occurrence of contact to the operating person via a haptic notifier if the robot contacts an object, wherein the force control uses contact force acting on the robot from the outside that is detected by a contact force sensor of the robot, the occurrence of the contact of the robot is determined in the notification control based on the contact force detected by the force sensor, the computer is caused to implement the notification control if the contact force detected by the contact force sensor is a predetermined upper limit or less, and the computer is caused to implement no notification control with the haptic notifier if the contact force detected by the contact force sensor exceeds the upper limit.

9. The remote control system of claim 1, wherein if the contact force detected by the contact force sensor exceeds the upper limit, the controller determines if the contact force is substantially constant for a predetermined period of time, if the contact force is determined to be substantially constant for the predetermined period of time, the controller updates a reference value for the contact force, and if the contact force is determined to be not substantially constant for the predetermined period of time, the controller does not update the reference value for the contact force.

* * * * *